United States Patent [19]

Novak

[11] 3,739,637

[45] June 19, 1973

[54] PNEUMATIC PRESSURE INDICATOR

[76] Inventor: Greg A. Novak, P. O. Box 511, Oakland, Calif. 94604

[22] Filed: Apr. 19, 1971

[21] Appl. No.: 135,330

[52] U.S. Cl. ............... 73/146.3, 73/419, 116/34 R, 116/67, 137/229
[51] Int. Cl. ........................................... B60c 23/04
[58] Field of Search .................. 137/229; 73/146.3, 73/146.8, 419; 116/34 R, 70, 67

[56] References Cited
UNITED STATES PATENTS

| | | | |
|---|---|---|---|
| 2,635,623 | 4/1953 | Moffett | 137/229 |
| 2,709,983 | 6/1955 | Divietro | 116/34 R |
| 1,769,508 | 7/1930 | Harned | 116/34 R |
| 3,285,222 | 11/1966 | Du Plessis et al. | 116/34 R |
| 1,487,851 | 3/1924 | Hammond et al. | 137/229 X |

FOREIGN PATENTS OR APPLICATIONS 24,958   10/1912   Great Britain ................... 116/34 R

*Primary Examiner*—Richard C. Queisser
*Assistant Examiner*—Daniel M. Yasich
*Attorney*—Bruce & McCoy

[57] ABSTRACT

A pneumatic tire pressure gauge or filler device having an adjustable biasing means for setting the air pressure which is contained in a tire. The device includes a whistle aperture whereby when the pressure contained in the tire is above the adjusted pressure, the excess pressure will escape through the aperture and emit a whistling sound.

2 Claims, 10 Drawing Figures

PATENTED JUN 19 1973 3,739,637
SHEET 1 OF 2
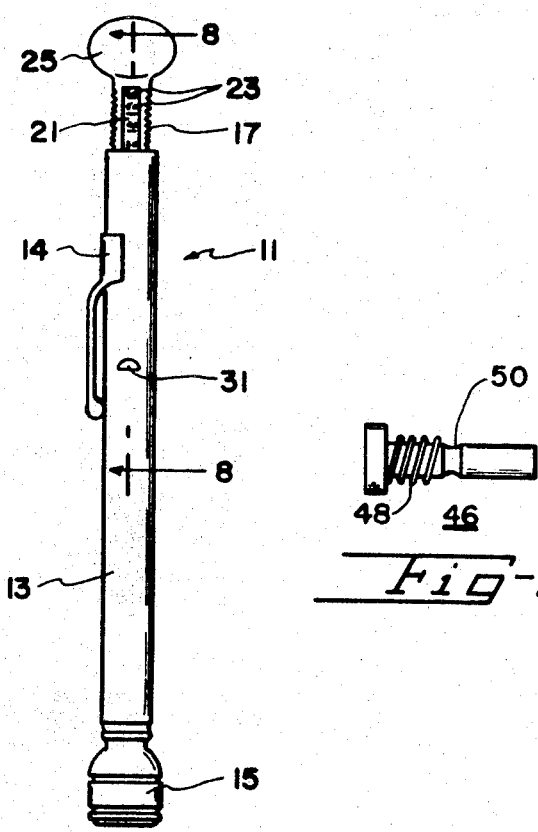
Fig-1
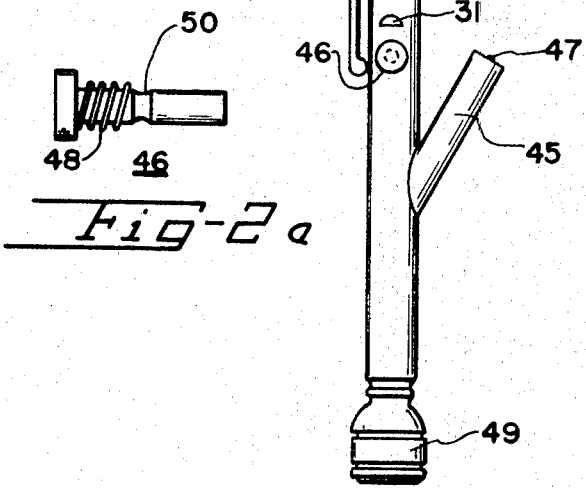
Fig-2a
Fig-2
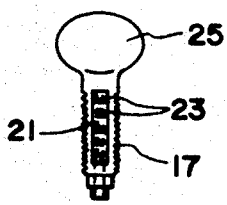
Fig-3
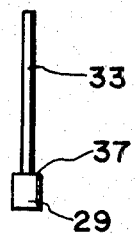
Fig-4
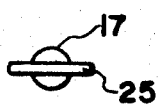
Fig-5
INVENTOR.
GREG A. NOVAK
BY Bruce & McCoy

PATENTED JUN 19 1973

INVENTOR.
GREG A. NOVAK
BY
Bruce & McCoy

PNEUMATIC PRESSURE INDICATOR

BACKGROUND OF THE INVENTION

1. Field of the Invention

The invention relates generally to air pressure gauges and more particularly to air pressure fillers or gauges which emit a whistling sound when a pressure over an adjustable, predetermined pressure is sensed thereby.

2. Description of the Prior Art

Pocket type tire pressure gauges are well known. These gauges usually have a body with a movable flat stem marked with various pressures inserted therein. When the inlet of the gauge is inserted over the stem of a tire, the air pressure of the tire is indicated by the outward movement of the flat stem.

Standard service station hoses, commonly found in gasoline and diesel fuel automotive fuel stations, include pressure gauges similar to the above-mentioned pocket type tire gauge, in that the stem thereof is forced outwardly and indicates the air pressure contained in the tire by numbered marks placed on the outwardly forced stem.

The presently available devices, however, merely indicate the air pressure contained in the tire or article to be filled, but do not give warning of overpressure, nor are they capable of relieving the pressure therein to thereby adjust the pressure contained in an article to an adjustable, predetermined pressure. The present invention overcomes the above disadvantages by providing a pneumatic pressure indicator, which is both adjustable, to thereby regulate the pressure contained in the article, and to emit a signal or whistle whereby a person is warned of any overpressure in the article being filled or measured.

SUMMARY OF THE INVENTION

The pneumatic pressure indicator of the invention comprises a hollow body with an inlet opening and a valve slidably mounted within the body. The valve is adjustably biased against a stop wherein it normally covers a whistle aperture formed in the body. If, upon application of pressure to the inlet passage, the pressure is over an adjusted, predetermined value, the valve will be moved against the action of the biasing means to allow excess pressure to exit through the aperture with a whistling sound.

OBJECTS OF THE INVENTION

It is therefore an object of the present invention to provide a pneumatic pressure indicator with a signaling means to indicate when a preset pressure is reached.

Another object of the invention is the provision of an adjustable biasing means whereby the advent of the indicating signal may be adjusted to a predetermined pressure. A further object of the instant invention is the provision of a pressure indicator which may be used to measure the pressure in a tire or the like and which indicates an adjustable, predetermined pressure in the tire by emitting a signal.

A further object of the invention is the provision of a pressure indicator which may be used to fill a tire or the like and which emits a signal when an adjustable, predetermined pressure is reached within the article being filled.

And it is still another object of the present invention to provide a tire with a valve stem which is adjustable to control the pressure contained in the tire and which emits a signal when the pressure in the tire is above the adjusted level.

DESCRIPTION OF THE DRAWINGS

FIG. 1 is a side elevation of a preferred embodiment of an adjustable, pocket-type pressure gauge in accordance with the present invention;

FIG. 2 is a side elevation of a second embodiment of the present invention, showing an adjustable pocket-type combination tire-filler and pressure gauge;

FIG. 2A is a side elevation showing the air inlet pin and compression spring of FIG. 2;

FIG. 3 is a side elevation of the adjustable thumbscrew insertable into the end of the pressure gauge of the present invention for adjustably controlling the pressure measured thereby;

FIG. 4 is a side elevation of the piston valve and stem for controlling escape of air from the pressure gauge of the present invention;

FIG. 5 is a top plan view of the thumbscrew of FIG. 4;

DESCRIPTION OF THE PREFERRED EMBODIMENTS

Figure 6:
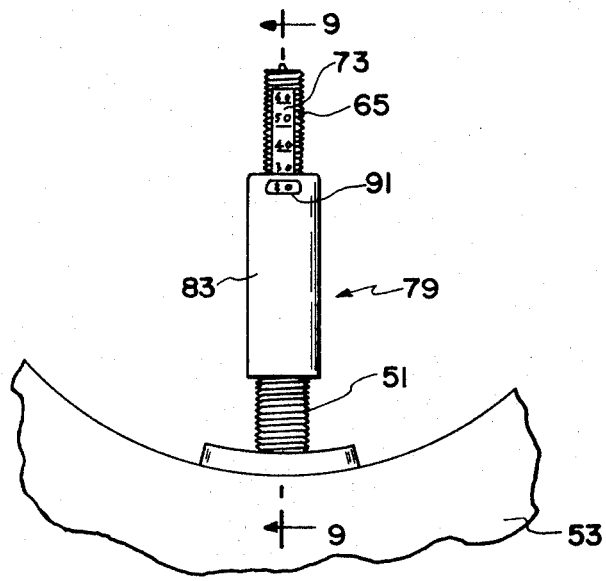
FIG. 6 is a side elevation of a third embodiment of the present invention, showing an adjustable pressure indicator for mounting on the valve stem of a tire.

In accordance with the present invention, a tire pressure measuring gauge or a tire filling attachment is provided with an adjustable biasing means controlling the operation of a valve for measuring and controlling the pressure contained in a tire. The invention further provides for a signaling means which indicates that the pressure in the tire is above the adjusted value, or which signals the user that the adjusted value has been reached.

Referring now to FIGS. 1, 3–5 and 8 of the drawings, there is shown a preferred embodiment of applicant's invention, comprising a pocket-type pneumatic tire air pressure gauge (11), having an elongated body (13) with an air pressure inlet head (15) at one end thereof. A pocket clip (14) is attached to the body and instead of the normal flat or rectangular stem inserted within a passage contained in the body, applicant's present invention comprises a threaded shaft (17) insertable into a thread (19) formed in an interior passage (20) of the body (see FIG. 8). The threaded shaft is preferably provided with at least one flat portion or side (21) having numerals (23) placed thereon, such as by embossing or stamping. The numerals are so calibrated and spaced apart, that when aligned with the end of the gauge body, or some other indicating means, the indicated numeral will represent the desired pressure in a tire or the like, as explained more fully hereinafter.

The threaded shaft (17) is preferably provided with an integral turning means, such as a thumbscrew (25), whereby it may be easily turned with respect to the gauge body.

Figure 8:
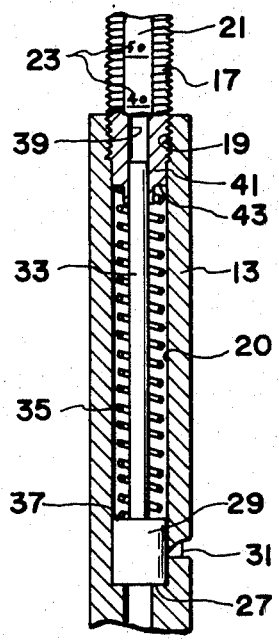
FIG. 8 is a partial cross-sectional view taken along line 8—8 of FIG. 1.

As shown more clearly in FIG. 8, the interior passage (20) is provided with a valve seat (27) having a valve (29) coacting therewith. Closely adjacent to and slightly above the valve seat, an aperture (31) is formed. As shown, the aperture is in the shape of a half-moon and is preferably of such dimensions that a whistling signal or sound will be emitted by air under pressure passing therethrough. The valve (29) is preferably of the piston type which completely blocks the passage of air through the valve seat and aperture in the closed position. The piston valve includes an elongated stem member (33) extending along the centerline of the gauge with a spring (35) surrounding the stem and resting against the top face (37) of the piston.

The threaded shaft (17) having the thumbscrew (25) formed integrally therewith is provided with a central blind-hole or passage (39) and includes an unthreaded bottom portion (41). A further reduced unthreaded portion is preferably fixed to the unthreaded bottom portion (41) whereby the spring (35) may slide over this portion into contact with a face (43). When the shaft (17) is threaded into the passage, the piston stem (33) extends into the blind-hole (39) and the face (43) acts against the free end of the spring. Therefore, when the threads of the shaft contact the interior threads (19) of the passage and the shaft is rotated therein, the piston stem (33) slides within the blind-hole (39), and the face (43) of the shaft acts to compress the spring to more positively bias or press the piston valve (29) into contact with the valve seat (27).

It is, of course, understood that the compression of the spring (35), and the marking of the numerals (23) on the flat surface of the shank, must be so calibrated and coordinated that when a numeral, such as 25, is aligned with the indicating means of the gauge body, the user of the gauge will therefore know that the spring is compressed to a 25 pound per square inch value whereby, as a minimum, a corresponding 25 psi pressure must be applied to the valve to lift the piston and thereby expose partially or wholly the whistle opening in the gauge body. When the piston valve is raised, any air escaping through the whistle aperture will emit a whistling sound readily discernible to the ears of a user and immediately give warning of the existence of a pressure over the adjusted value Therefore, with the proper calibration and coordination of the spring with the numerals marked on the threaded shaft, the initial or first movement of the valve away from its seat and the whistling sound caused by the air escaping through this initial opening, will indicate that the exact same pressure has been reached in the tire.

FIG. 2 discloses a further embodiment of the present invention, wherein the gauge body (13) is modified by providing it with an air inlet passage (45) formed integrally therewith. An air hose engaging pin (47) of a standard tire stem valve is preferably provided within the passage (45). The air inlet is adapted so that a rubber hose, of the type commonly found in service stations may be quickly attached thereto.

However, if this embodiment is to serve as a permanent filling station tire-inflating device, the air-inlet passage (45) may be fashioned at its end in the form of a quick-disconnect male air connection for permanent attachment to the standard gas station air-filling hose female connection. In this application, the tire stem valve together with the air hose engaging pin (47) is omitted, and an air-inlet pin (46) is provided. Pin (46) is inserted in a bore (not shown) formed in body (13) and and held therein in any desired manner, such as by peening over the outer free end of the pin (46) which extends through the body 13 and emerges at the other side thereof, opposite that shown in FIG. 2 of the drawings. The other end of the pin has an enlarged head portion which is normally biased outwardly by a compression spring (48) to thereby cause the enlarged diameter portion of the pin to block the flow of air through passage (20). Pin (46) includes an air-escape groove (50) formed therein which is normally biased into the blocked position within the wall of the body (13), whereby, upon depression of the pin against the action of spring (48), the groove (50) will be aligned with passage (20) to permit air to flow therethrough.

When the tire is to be inflated, the thumb-screw (25), preferably provided with a quick-acting thread, is turned to the required tire-pressure numbered setting, and the tire is inflated to the point at which a whistling sound is commenced. At this point, the inlet head of the inflating device is removed from the tire-valve stem. In this usage, the pocket clip (14) may be omitted.

Here, the end or outlet coupling (49) is so constructed that it engages the usual spring-loaded air-inlet valve (not shown) of a tire valve-stem to which it is connected. Therefore, if the thumbscrew adjusting mechanism is again pre-set to the 25 pound level, when the pressure of the air within the tire, and therefore within the lower passage, is 25 pounds or above, the piston valve will be forced upwardly, against the biasing force of the spring, and the air escaping through the aperture will emit a whistling sound, thereby indicating to the user that the adjusted pressure has been applied to or reached in the tire.

Figure 7:
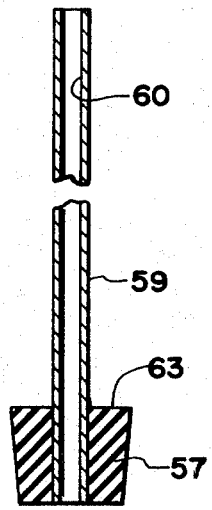
FIG. 7 is a side elevation of a modified piston valve for use with the pressure indicator of FIG. 6.
Figure 9:
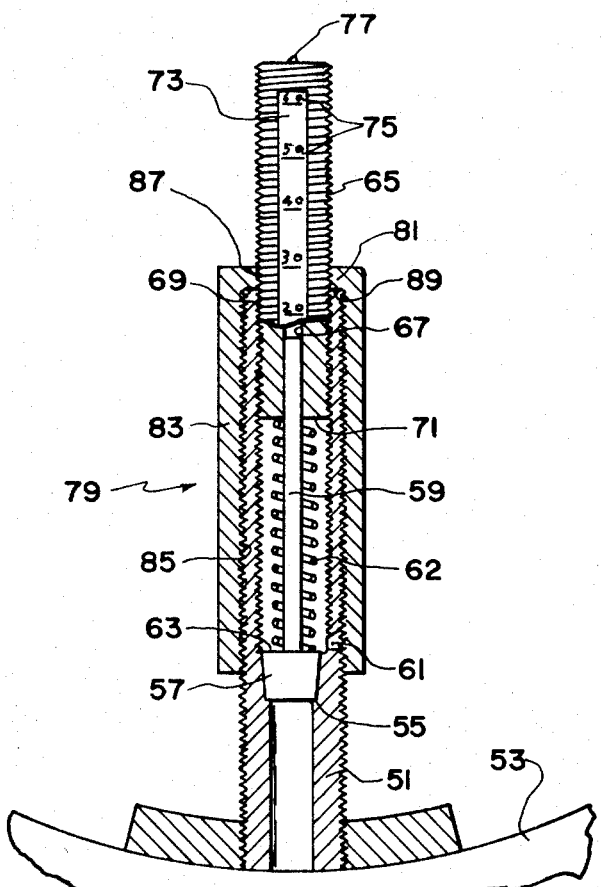
FIG. 9 is a partial cross-sectional view taken along line 9—9 of FIG. 6.

FIGS. 6, 7 and 9 disclose a third embodiment of the present invention wherein the valve stem (51) of a tire (53) is provided with adjustable gauge and whistling aperture. The standard stem, now presently used in all existing tires and tubes, may be used by merely removing the springloaded air inlet valve therefrom, and forming a valve seat (55) within the central passage. A piston valve (57) having a stem (59) fixed thereto and provided with a passage (60) extending centrally thereof through the piston valve is inserted into the valve stem into contact with the valve seat. A whistle aperture (61), similar to the whistle aperture set forth above, is formed in the valve stem slightly above the valve seat. A compression spring (62) is slid over the piston stem into contact with the upper face (63) of the piston valve and a hollow threaded shaft (65), having a passage (67) extending centrally thereof, is threaded into fairly tight fitting internal threads (69) formed within the valve stem. The central passage (67) of the threaded shaft is of such a diameter that a portion of the hollow piston stem (59) is insertable therein whereby the threaded shaft may be threaded downwardly within the stem to enable its end (71) to compress the spring and whereby, upon upward movement of the piston valve against the force of the spring, the piston stem may slide freely therein.

In the preferred embodiment shown, the threaded shaft (65) is provided with turning flats (73) on opposite sides thereof. Properly calibrated and coordinated numerals (75) are formed on each of the flats. The upper end of the internal passage (67) of the hollow shaft is provided with an internal seat (not shown) having a spring bias air inlet valve (77) coacting therewith, whereby, when a pressurized air hose is inserted over the end of the threaded shaft, air will force the valve

(77) downward and allow pressurized air to pass through the central passage (67) in the shaft, to the passageway (60) formed through the piston stem and valve and into the tire or tube to be filled.

The threaded shaft (65) is adjustable by applying a wrench or the like to the two flat sides (73) thereof and turning the shaft until the numerals formed thereon are aligned with an indicating means, such as the upper end of the valve stem. To prevent accidental movement of the shaft when the tire is turning or is brushed against some object, a combination lock nut and aperture closure ring (79) is provided. The combination lock nut and closure ring comprises an upper locking portion (81) and a hollow, extending skirt portion (83). The skirt (83) is provided with threads (85) formed internally thereof, whereby it may be threaded with a fairly lose fit over the tire stem. A threaded bore (87) is formed in the upper locking portion (81) to allow the bore to be threadedly mounted over the threaded shaft (65). When the locking portion (81) in its operative position with the bottom portion (89) thereof in contact with the top of the tire stem, the threaded shaft will be prevented from moving.

To enable a person to see at what value the compression of the spring (62) acting against the valve has been set, number-viewing windows (91), spaced 180° apart, are provided in the skirt portion (83). These viewing windows are aligned with the numerals on both flats of the threaded shaft when the lock nut is in the operative position, whereby the value of adjusted pressure is easily discernible. Moreover, the skirt portion (83) is of such a length that in the locked position of the member (79), the whistle aperture is closed. This will insure protection of the whistle aperture and prevent dirt and other foreign matter from entering therein.

In this last embodiment of the invention, the valve stem provided on the tire enables an initial setting of the pressure to be applied to the tire to be made, and no further setting thereof is required. Therefore, with the threaded shaft in the properly set position, such as 25 psi, and an air hose is inserted over the free end of the threaded shaft to apply air thereto, air will continue to flow into the tire until the pressure reaches the adjusted valve. Any over-pressure will cause the piston valve to be moved upwardly against the biasing force of the spring to allow the air to escape through the uncovered aperture causing a whistling sound to be emitted. If the lock nut and aperture closure ring member (79) is applied to the stem valve, the member is merely loosened to uncover the whistle aperture.

Therefore, an important advantage of the present invention is the signal whistling capabilities of the pressure indicator which signals the user thereof that the pressure in the tire or the like is above the adjusted value.

Furthermore, with the unique combination of safety and signaling features of this invention, a predetermined, adjustable pressure may be both measured and regulated in a tire or the like.

What is claimed is:

1. A pneumatic pressure gauge comprising
a. an elongated body having a passage extending therethrough along the entire length thereof,
an inlet opening formed at one end of said body and in fluid communication with said passage,
a seat formed within said passage,
a piston valve slidably mounted within said passage said piston valve in contact with said seat for controlling the flow of gas through said seat and having a shaft connected thereto,
a whistle aperture formed in said body and extending into said passage adjacent to said seat,
a threaded rod having indicia thereon and a thumbengaging means at one end formed integrally therewith and an aperture at the opposite end said rod threadedly carried at the other end of said body within said passage, the end of said piston shaft slidable in said aperture, and
a spring held between the end of said threaded rod and said piston valve, whereby, when said thumbscrew and rod are turned in said body, said spring adjustably biases said valve against said seat to a desired pressure, whereby, if the pressure of said gas in said passage is over said adjusted pressure, said valve will be moved against the action of said spring to open said seat and to allow gas to exit through said aperture with a whistling sound.

2. A pressure indicator comprising:
a body having a passage extending therethrough, an inlet opening formed at one end of said passage for insertion over a fixed stem of a tire or the like for fluid communication therewith,
an outlet passage formed in the side of said body and in fluid communication with said passage,
a seat formed within said passage spaced from said inlet opening and above said inlet opening,
pin means slidably mounted in said body between said outlet and said seat for controlling the flow of gas therebetween,
a piston valve means having a rod connected thereto and slidably mounted within said passage in contact with said seat for controlling the flow of gas through said seat,
said outlet passage comprising a whistle aperture formed in said body in connection with said passage and adjacent to said seat spaced from said inlet opening toward the other end of said body,
the other end of said body having screw threads formed within said passage,
a threaded shaft having an aperture at one end and a thumbscrew integrally formed at the other end and rotatably mounted within said threaded end, said piston rod slidably co-operating with said aperture in the threaded shaft,
a spring mounted in said passage between said piston valve and said threaded shaft whereby, upon rotation of said shaft by said thumbscrew, said piston valve means will be adjustably biased against said seat, whereby upon application of pressurized gas to said inlet opening, said opening will have gas fed thereto and into a tire until said adjusted biasing force of said piston valve is reached, and, whereby, upon actuation of said pin means to its unblocked position, gas over said predetermined pressure will cause said valve to open to allow said gas at said excess pressure to pass through said seat and escape through said aperture whistle with a whistling sound.

* * * * *

UNITED STATES PATENT OFFICE
CERTIFICATE OF CORRECTION

Patent No. 3,739,637    Dated June 19, 1973

Inventor(s) Greg A. Novak

It is certified that error appears in the above-identified patent and that said Letters Patent are hereby corrected as shown below:

IN THE SPECIFICATION

Column 3, line 42, after "value" add a period.

line 66, after "and" delete "and".

Column 5, line 44, change "valve" to -- value --.

line 62, omit "a.".

IN THE CLAIMS

Column 6, line 63, change "aperture whistle" to -- whistle aperture --.

Signed and sealed this 19th day of February 1974.

(SEAL)
Attest:

EDWARD M. FLETCHER, JR.
Attesting Officer

C. MARSHALL DANN
Commissioner of Patents